(12) United States Patent
Erickson et al.

(10) Patent No.: US 6,591,265 B1
(45) Date of Patent: Jul. 8, 2003

(54) DYNAMIC BEHAVIOR-BASED ACCESS CONTROL SYSTEM AND METHOD

(75) Inventors: Thomas D. Erickson, Minneapolis, MN (US); Wendy A. Kellogg, Yorktown Heights, NY (US); Peter K. Malkin, Arsdley, NY (US); John T. Richards, Chappaqua, NY (US); Philip S. Yu, Chappaqua, NY (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/542,481

(22) Filed: Apr. 3, 2000

(51) Int. Cl.[7] ............................................. G06F 17/30
(52) U.S. Cl. ....................... 707/9; 707/5; 713/200
(58) Field of Search ......................... 707/9, 102, 100, 707/5; 713/200–202

(56) References Cited

U.S. PATENT DOCUMENTS

| | | | | |
|---|---|---|---|---|
| 5,493,692 A | * | 2/1996 | Theimer et al. | 455/26.1 |
| 5,621,889 A | * | 4/1997 | Lermuzeaux et al. | 713/200 |
| 5,920,861 A | * | 7/1999 | Hall et al. | 707/102 |
| 5,987,606 A | * | 11/1999 | Cirasole et al. | 713/200 |
| 5,987,611 A | * | 11/1999 | Freund | 713/201 |
| 5,991,306 A | * | 11/1999 | Burns et al. | 370/429 |
| 6,308,274 B1 | * | 10/2001 | Swift | 710/200 |
| 6,314,425 B1 | * | 11/2001 | Serbinis et al. | 705/26 |
| 6,336,117 B1 | * | 1/2002 | Massarani | 707/100 |

FOREIGN PATENT DOCUMENTS

WO    WO 9617286 A2 *   6/1996    ............. G06F/1/00

OTHER PUBLICATIONS

"Towards Access Control for Logical document Structures," Proceedings of the ninth International Workshop on Database and Expert Systems Applications, Aug. 26, 1998, IEEE 98EX130, pp. 322–327.*

* cited by examiner

Primary Examiner—Hosain T. Alam
(74) Attorney, Agent, or Firm—F. Chau & Associates, LLP (57) ABSTRACT

The present invention provides a method for controlling an entity's access to a resource based on observed behavior of the entity. The method assigns the entity a default authorization meta-tag. The method monitors the entity's behavior and updates the entity's meta-tag based upon the observed behavior. Accordingly, dynamic behavior-based access control is achieved.

21 Claims, 6 Drawing Sheets

DYNAMIC BEHAVIOR-BASED ACCESS CONTROL SYSTEM AND METHOD

BACKGROUND OF THE INVENTION

1. Field of the Invention

The present invention relates to a computer access control system, and more particularly to an automatic and dynamic access control system and method for assigning privileges based on observed behavior.

2. Description of the Related Art

Access and control of access are two prevailing paradigms in computer networks. The basic theories underlying access in its broad sense are centuries old. For example, access to clubs, for example the New York Yacht Club, has typically been based on an individual's standing in the community. Standing being the amalgamation of traits, credentials, references, and the like. Individuals who exhibit desirable traits are granted greater access to resources not available to another individual who has demonstrated undesirable traits.

Various methods of controlling access to computer file systems have been addressed and developed. For example, standard file systems, e.g. UNIX, are controlled by super-users, or those with the right to set access rights of others on the file system. Access control is based on a user ID. The user ID is limiting, with one variable, the scope of the access control policies is limited. For example, with standard user ID-based access control, the super-user has no practical method to limit the access to an operating system kernal upgrade to those with a sufficient level of expertise in maintaining and compiling kernals.

Another related art includes IRC. In IRC chat environments an individual either does or does not have acces to a given chat community. This may depend on manual settings accessible by an administrator or the community. The same is true for the right to create and join new communities, or channels. After violating one or more of the community's rules, messages may be sent to the community's administrator, and subsequently the individual may have their access rights changed. The alteration of access rights in this situation requires several manual operations, and no automated process exists.

Online auctions, for example EBAY.com, provides a method of rating potential buyers and sellers based on other users experiences with the-individual. The rating takes the form of a +1, −1, or 0 from each user who has posted a rating for the individual. Buyers and sellers can then check both a list of comments, plus the sum of all numeric grades. For example, if a potential seller has both many positive comments and a high positive numeric grade, then a buyer should feel secure in doing business with the associated seller. Although this process does provide a means for a user to be rated on their behavior, no standardized grading process is used. Each commentor's numeric grade is based on individual opinions. Therefore, one reviewer's 1 rating might be another's 0. Also the process is manual, requiring user input, if no user makes a comment then no rating will be available. Further, this and other methods lack a means to take into account the passage of time. For instance, a rating made two years ago has a lower credibility then one made last week. Finally, these systems do not function to change the individual's access privileges.

Another system which relates to privacy is the PGP or Pretty Good Privacy. This system provides users with a method for protecting data through asymmetric encryption. Although this affects others access control, it does not do so on the basis of qualities of the requestor. Like the methods above, PGP, must be altered manually if desired.

Alternatively, PIC provides a language to express meta-tags, but does not provide a method for updating the meta-tags.

Finally, PICSRules provides a method to filter information requests based on meta-tags. Like the PICS labels standard above, it does not provide a method to update meta-tags automatically, and it only provides yes/no responses. The method lacks a function to specify multiple types of access authorization, e.g. read-only, read-write, or read-write-execute.

Therefore a need exists of a system and method for dynamically enabling access control for a computer network user which is automatically generated based on the observed behavior of the individual.

SUMMARY OF THE INVENTION

In one embodiment of the present invention, a method for controlling an entity's access to a resource based on observed behavior of the entity is described. The method assigns the entity a default authorization meta-tag, monitors the entity's behavior, and updates the entity's meta-tag based upon the observed behavior.

The authorization meta-tag is multidimensional. Further, the meta-tag can be embodied in a PICS label. Further, access can be granted to the resource policies having a present level of rating from the entity's authorization meta-tag. The resource can be, for example, data and executables.

The meta-tag may characterize, for example, an entity's dependability, expertise, interactivity, activity, quality of input and hostility. Though other characteristics are contemplated. The meta-tag may further include a confidence level rating for one or more ratings contained in the meta-tag. The authorization meta-tag may change in relation to time.

Another embodiment of the present invention discloses a computer usable medium having computer readable program code for automatically updating a key-value rating based on the observed behavior of users. The computer readable program code in the computer program product includes a computer readable program code for causing a computer to retrieve a policy from a policy database, determine an update to the key-value rating, and post the updated key-value rating in the key-value rating database.

The key-value rating includes at least one pair of indicia describing a user. The key-value rating is stored and accessed as a meta-tag, the meta-tag having at least one key-value rating pair. Further, the key-value rating is assigned to a new user and stored in the key-value rating database. The key-value rating includes a value corresponding to the observable behavior.

The observed behavior having one of a defined observable behavior and a Boolean combination of defined observable behaviors. The Boolean combination is defined as a plurality of behaviors linked by an operation in a policy.

The computer determines an update by comparing the retrieved policy to the observed behavior. Further, the computer posts an update to the key-value rating database when the retrieved policy matches-the observed behavior.

In another embodiment the invention includes a program storage device readable by machine, tangibly embodying a program of instructions executable by the machine for automatically updating a key-value rating based on observed behavior. A policy is retrieved from a policy database, an update to the key-value rating is determined, and the updated key-value rating is posted in a key-value rating database.

The key-value rating is assigned to new users as a default key-value rating. The key-value rating is stored in the key-value rating database. The key-value rating is modified according to the policy, the policy specifies the modification based on observed behavior.

The update is determined by comparing the retrieved policy to the observed behavior; if the observed behavior is equal to a behavior defined in the policy increment the key-value rating; if the observed behavior is not equal to a behavior defined in the policy the key-value rating is not updated.

BRIEF DESCRIPTION OF THE DRAWINGS

This disclosure will present in detail the following description of preferred embodiments with reference to the following figures wherein.

DETAILED DESCRIPTION OF THE PREFERRED EMBODIMENT

In a preferred embodiment, the present invention provides dynamic access control in an Hypertext Transfer Protocol (HTTP) based information repository. Those with regular skill in the art will appreciate that other types of data repositories can be handled similarly, including but not limited to File Transfer Protocol (FTP) databases, Network News transfer Protocol (NNTP) archives, Internet Relay Chat (IRC) communities, and standard databases, for example, Notes® and DB2® Universal Database.

In standard web (HTTP) servers, access to data, e.g., Hypertext Markup Language (HTML) documents, and executables, e.g. cgi-bin scripts, can be restricted on the basis of user IDs, i.e., a web server can be configured so that a given document can only be read and modified by a particular user; read by another user; and all other users are denied access of any kind. User IDs can also be collected into sets, so that access can be specified on the basis of group membership. For example, if all users who were authorized to administer a particular web server were included in a Super-user group, then access to all administration data could be restricted to the Super-users as a group.

In the present invention, instead of using simply user IDs and groups of user. IDs, meta-tags are used. Each registered user has a meta-tag associated with them, as does each registered group. Meta-tags provide at least one key-value rating having indicia describing the user. For example, the following meta-tag is a key-value rating pair (two pieces of information) indicates that the associated user's overall rating equals three:

[(Overall 3)]

Such a meta-tag would be embodied in a memory component of a server.

Another example of a meta-tag indicates, in addition to the user's overall rating of three, an activity rating of six, a dependability rating of 1, and an expertise rating of 10. The meta-tag is thus multidimensional, capable of embodying more than one rating.

[(Overall 3)
(Activity 6)
(Dependabilty 1)
(Expertise 10)]

Yet another example shows a meta-tag in which the expertise rating contains three separate ratings, a programming rating, a music rating, and a cooking rating.

[(Overall 3)
(Expertise
 (Programming 9)
 (Music 9)
 (Cooking 2))]

In an alternative embodiment a group of users has an associated meta-tag. The group's meta-tag is retrieved using a group handle or name.

The following preferred embodiment will be discussed with respect to FIG. 2. Each meta-tag is stored in a database, the Meta-Tag Database, 2080, a given user's meta-tag being accessed using that user's ID or like indicia. These meta-tags are not static, but instead, are constantly updated be Meta-Tag Update Handle, 2040.

One skilled in the art will appreciate how each key-value pair could be replaced by a key-value pair with a confidence component, or a key-value rating triplet (three pieces of information), the third new value indicating the confidence to which the rating is trusted. For example:

[(Overall 3 10)
(Expertise 10 1)]

The meta-tag above indicates that the corresponding user has an overall rating of 3, trusted to a level of 10, and expertise level of 10 which is only trusted to a level of 1. It is to be understood that additional elements can be added to a key-value rating, including but not limited to: confidence, a value relating to the age of the information posted, maximum and minimum key-value over time, etc.

One skilled in the art will appreciate how these meta-tags could be written using the PICS Label standard. PICS is a World Wide Web Consortium (W3C) recommendation. Although the PICS labels were intended to be used to rate web pages, the standard may be used for rating users. A given label would contain a reference to the user it rates, using the user's ID, rather than a URL for a web page. The following is a PICS-version of the user meta-tag described above:

(PIC-1.1
  label for "Jonathan Jones"
  "http://www.SmallOrg.com/gated_community.html"
  ratings(
    Overall 3
    Expertise_Programming 9
    Expertise_Music 9
    Expertise_Cooking 2)
)

The first line indicates that PICS-1.1 label format is being used. Next, the semantics for the rating keys, e.g. Overall, can be learned from URL http://www.SmallOrg.cdm/gated_community.html. And further the ratings are: Overall 3; programming expertise 9; music expertise 9; and cooking expertise 2.

Those skilled in the art will appreciate that these PICS-formatted user ratings labels can be distributed from a PICS Label Bureau, and can be digitally signed using the PICS—recommended digital signature technique. The digital signature facilitates error checking functions. Other error checking techniques known to one ordinarily skilled in the art are also contemplated as part of the invention.

One skilled in the art will also appreciate that a given user's key-value rating pairs could also be stored and accessed in a variety of other means other then meta-tags. For example, a file, a database, and other like means.

When using meta-tags instead of simple IDs, access control can be specified in terms of the ranges of values of key values pairs. For example, write access to a directory containing answers to help line questions could be restricted to users whose programming expertise and dependability were sufficient, for example greater then 6 and between 6 and 10 inclusive, respectively. In the present invention, these meta-tag-based restrictions would be specified using meta-tag access control policies. These policies would specify the required range of rating levels necessary for access. The following is an example of a policy which expresses the access restriction to the directory of answers to help line questions:/help-line/question-answer/, mentioned above:

[(Access level: Read-Write
 (Requirements:
  (Expertise (Programming>6))
  (Dependability 6–10))]

This policy specifies that in order to have read and write access, i.e., HTTP GET and PUT, to the /help-line/question-answer/ subdirectory, the given requestor must have programming expertise rating greater than 6, and a dependability rating between 6 and 10 inclusive.

In a preferred embodiment each of the access control policies is stored in the Access Policy control Database, 2070, and accessed by the Access control Handier routine, 2050, using the title of the resource.

Those skilled in the art will appreciate that the access control policies could also be written using a rule-based language like Prolog. With this embodiment, to determine whether a given user is authorized to perform a given action, the Access Control handler, 2050, could instantiate all known values and then determine if the necessary access rights condition is satisfied.

One skilled in the art will also appreciate that these access control policies can be used to control access to the meta-tags themselves. Thus, for example, one might want to access one's own meta-tag to gauge whether to attempt to apply for membership in an exclusive sub-group or one's overall community, this might be impossible since their access rights do not authorize them to review their own meta-tag.

Figure 1:
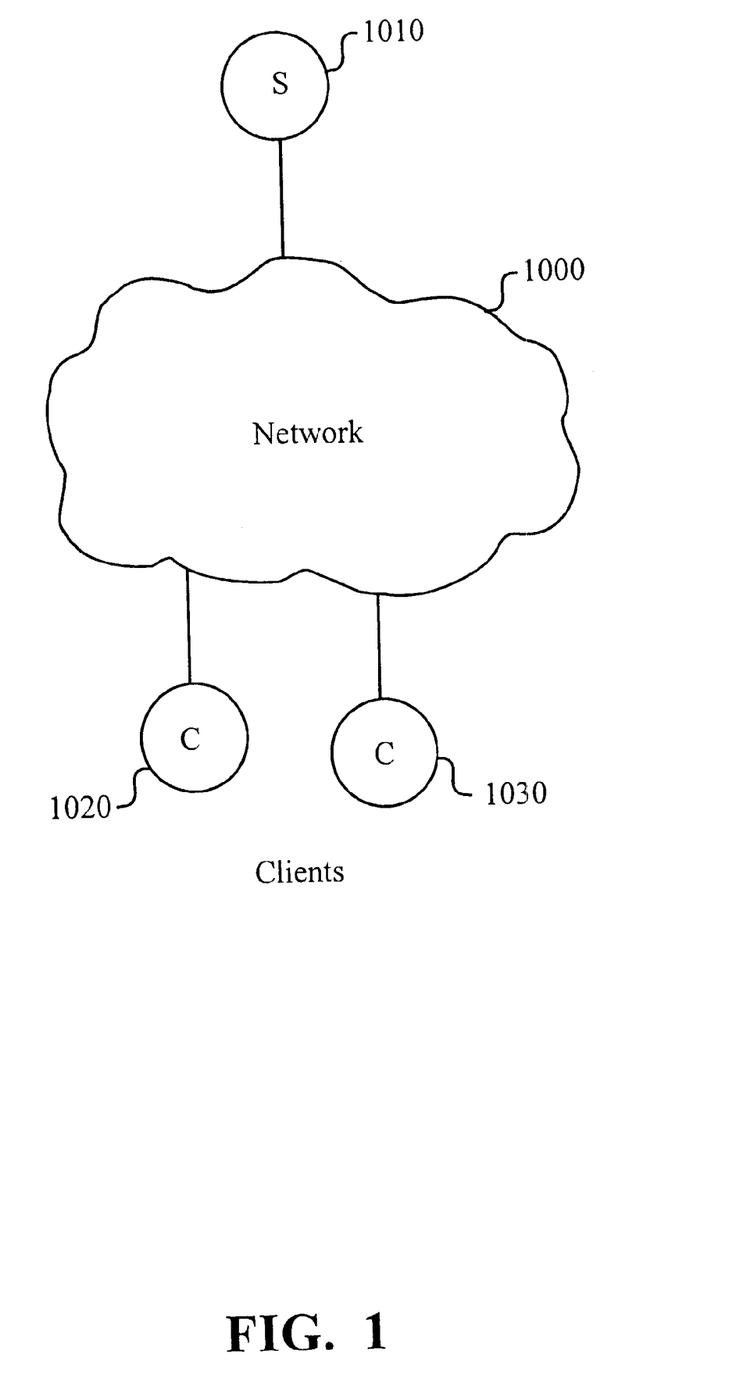
FIG. 1 is an illustration of network topology according to a preferred embodiment of the present invention.

FIG. 1 shows an example of an overall logical network topology. The Dynamic Access Control Server, 1010, which will be described in detail with reference to FIG. 2, FIG. 3 and FIG. 4, and clients 1020 and 1030, are shown, the present invention is applicable to any number of clients.

The Dynamic Access Control-Server, 1010, can run on any computing node, which includes but is not limited to, IBM S/390 Sysplex®, SP2® and RS/6000® workstations. Example of the network 1000 include but are not limited to, the Internet, the World Wide Web, an Intranet and local area networks (LANs). Examples of clients 1020 and 1030 can include an IBM WorkPad®, a personal computer (PC), workstation, set top box and the like. Examples of the software that can run on the clients 1020 and 1030 include, for example, Netscape's Navigator® web browser.

Figure 2:
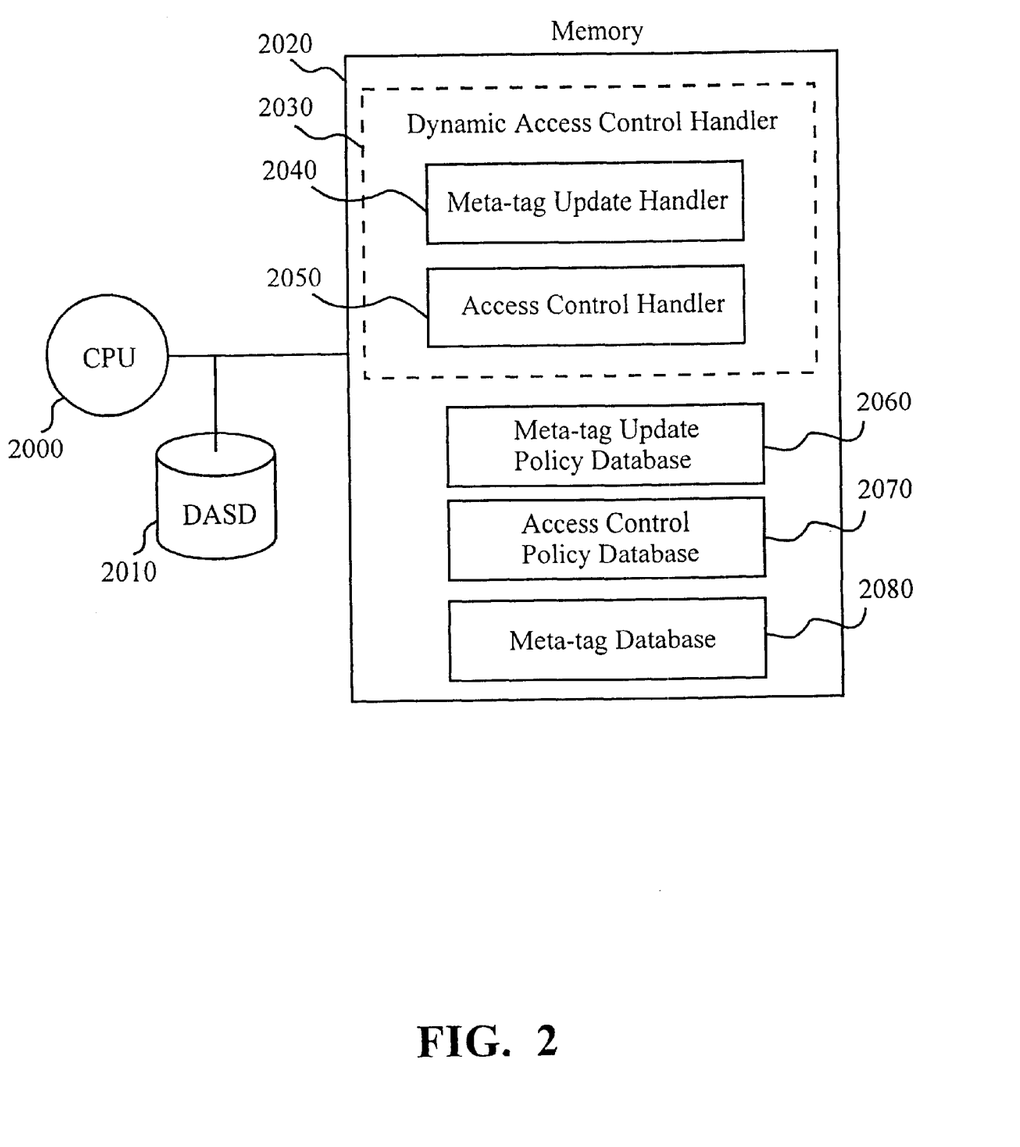
FIG. 2 is a block diagram of a dynamic access control server according to a preferred embodiment of the present invention.

FIG. 2 shows a Dynamic, Access Control Server 1010, the server which provides dynamically determined access control to the Dynamic Access Control Server's data and services. The Dynamic, Access Control Serve 1010 preferably includes a CPU 2000, memory 2020 such as RAM, and storage devices 2010 such as a disk or a direct access storage device (DASD). According to the present invention, the Dynamic, Access Control Server logic is preferably embodied as computer executable code that is loaded from remote or local permanent optical or magnetic storage such as a CD-ROM, of 3½ inch disk, or DASD 2010 into memory 2020 for execution by CPU 2000. The memory 2020 preferably includes a dynamic access control handler 2030; and access control handler 2050; a meta-tag update policy database 2060; and an access control policy database 2070. An example of the meta-tag update policy database 2060, the access control policy database 2070, and the meta-tag database 2080 includes but is not limited to the database server DB/2®, by IBM.

Figure 3:
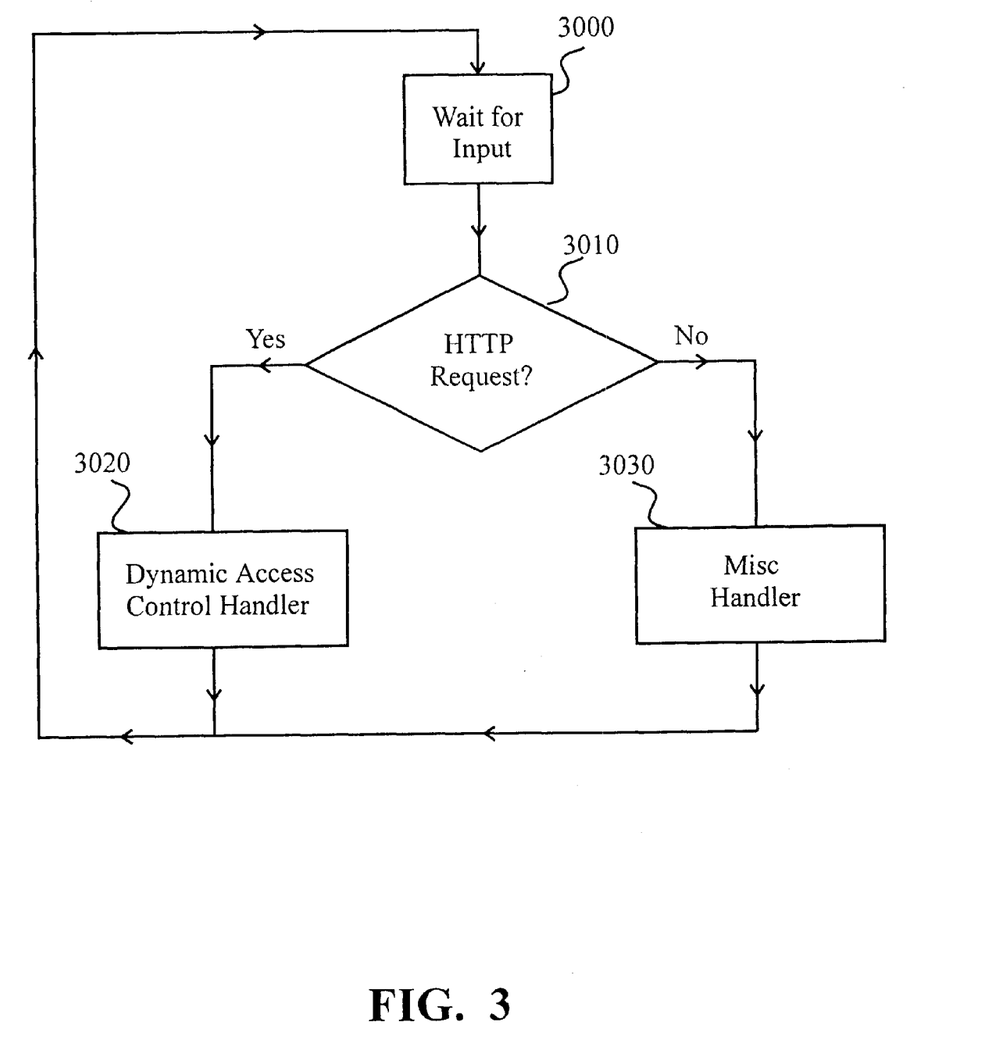
FIG. 3 is a flow diagram of a method of the dynamic access control server according to one embodiment of the invention.

FIG. 3 depicts an example of the Dynamic, Access Control Server logic. In step 3000, the Dynamic, Access Control Server 1000 waits for input. In step 3010 the request type is checked and, if it is not an HTTP request then, in step 3030, the appropriate miscellaneous handler is invoked. Otherwise, in step 3020, the Dynamic, Access Control Handler 2030 is invoked. When control is returned by either the Dynamic, Access Control Handler 2030/3020 or the Miscellaneous Handler 3030, control continues at step 3000.

Figure 4:
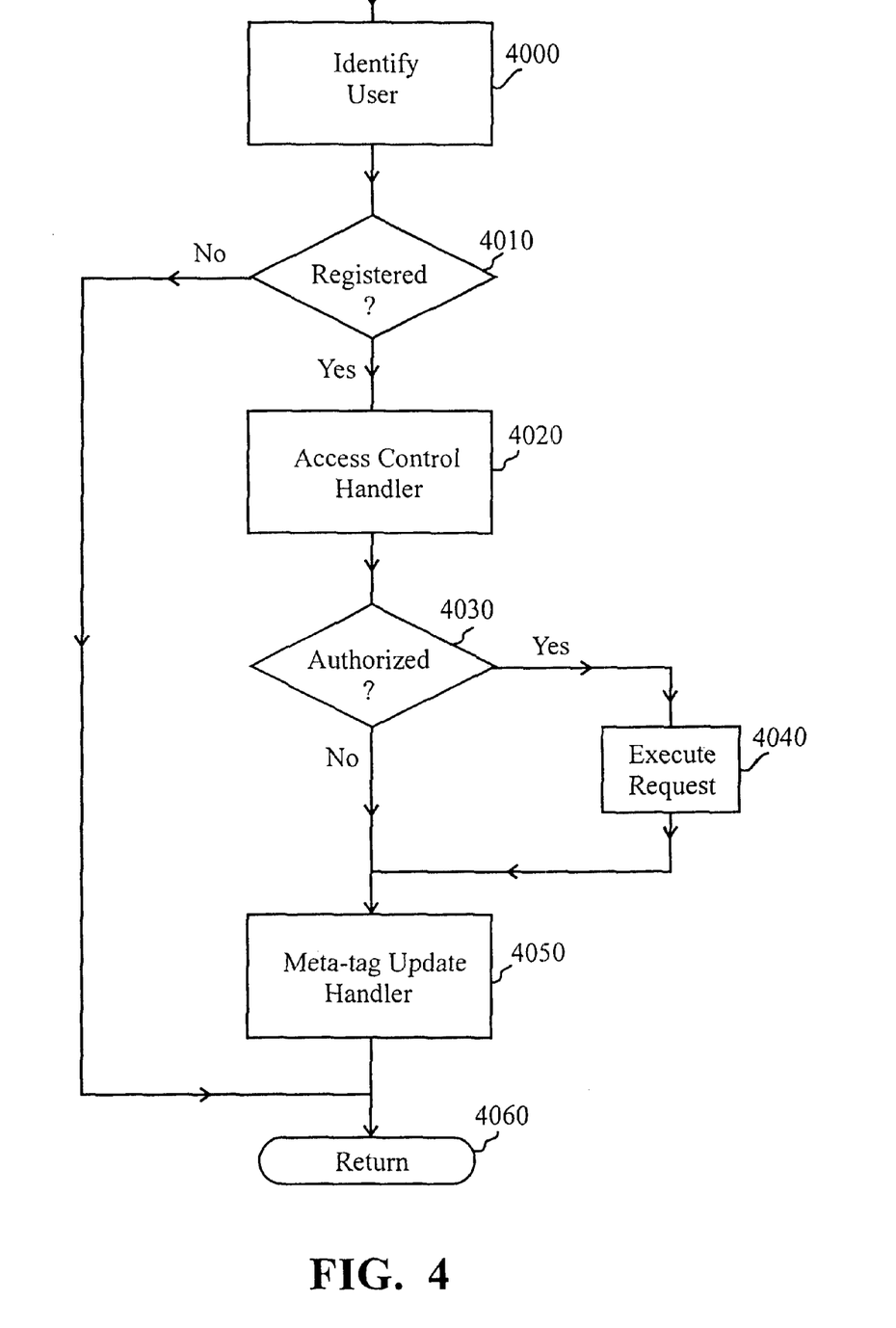
FIG. 4 is a flow diagram of a method of the dynamic access control handler according to an embodiment of the invention.

FIG. 4 depicts an example of the Dynamic, Access Control Handler 2030, which is essentially a conventional HTTP web server, e.g. IBM's Internet Connection Server (ICS), whose behavior is augmented by an application program interface(API), e.g. ICAPI which is included with the ICS. This API allows a web master to configure the Dynamic, Access Control Handler 2030 so that it passes control to specified modules, e.g. a Meta-Tag Update Handler 2040 and an Access Control handler 2050, at particular points during transaction processing, control is returned to the Dynamic Access Control Handler 2030 when each of these modules completes.

As shown in FIG. 4, step 4000 shows that the user is identified using the standard HTTP logon procedure which requires the user to specify both their user ID and password. If the user's ID/password pair are not recognized in step 4010, the Dynamic Access control handler 2030 returns control in step 4060. Otherwise, in step 4020, the Access Control Handler 2050 is invoked. When the Access Control Handler 2050 returns control, it indicates whether or not the current user is authorized for the current HTTP request. Only if the answer is yes when checked in step 4030 does the Dynamic Access control Handler 2030 execute the request in step 4040. Regardless of the answer, in step 4050, the Meta-Tag Update handler 2040 is invoked. Upon return, the Dynamic Access control Handler 2030 returns control in step 4060.

Figure 5:
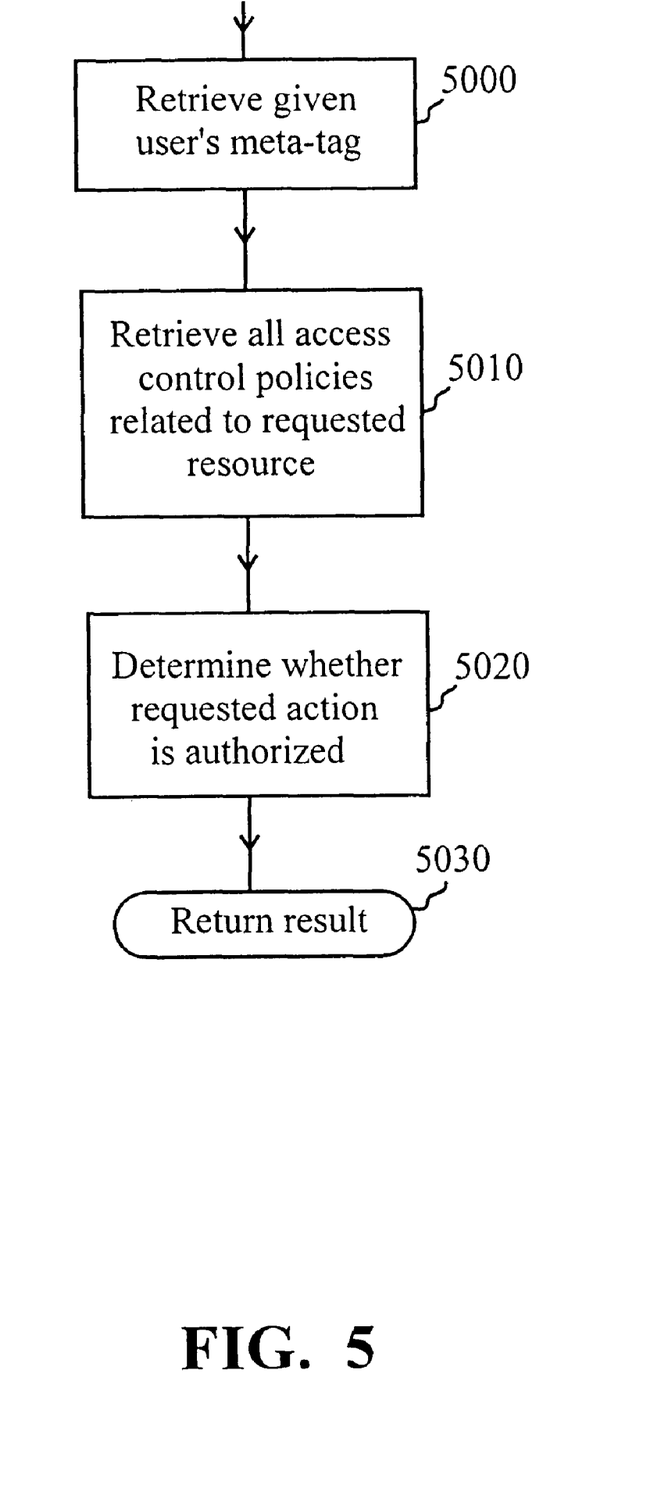
FIG. 5 is a flow diagram of a method of an access control handler according to one embodiment of the invention.

FIG. 5 depicts an example of the Access Control handler 2050, the module which determines whether or not a given user, or user group, is-authorized to access a given requested resource. In step 5000, the Access Control Handler 2050 retrieves the given user's meta-tag from the Meta-Tag Database 2080. Although in a preferred embodiment it is assumed that the user was assigned a default meta-tag, one containing default values for all key-value pairs, one with skill in the art can appreciate how a user could also be assigned this default meta-tag the first time they try and access a secured resource. In this case, when the Access control handler 2050 tried to retrieve the user's meta-tag it would find that none existed. At this point the Access Control Handler 2050 could assign the given user a default meta-tag and store it in the Meta-Tag Database 2080. Step 5010 of FIG. 5, shows that all policies related to the requested resource are retrieved from the Access Control Policy Database 2070. In step 5020, the Access Control Handler 2050 determines whether the requested action is authorized using the access control policies and the user's meta-tag, i.e., by instantiating the policies which the meta-tag values are associated with and the checking resulting rules for inconsistencies (as explained in greater detail below with respect to FIG. 6). In step 5030, the results are-returned.

Figure 6:
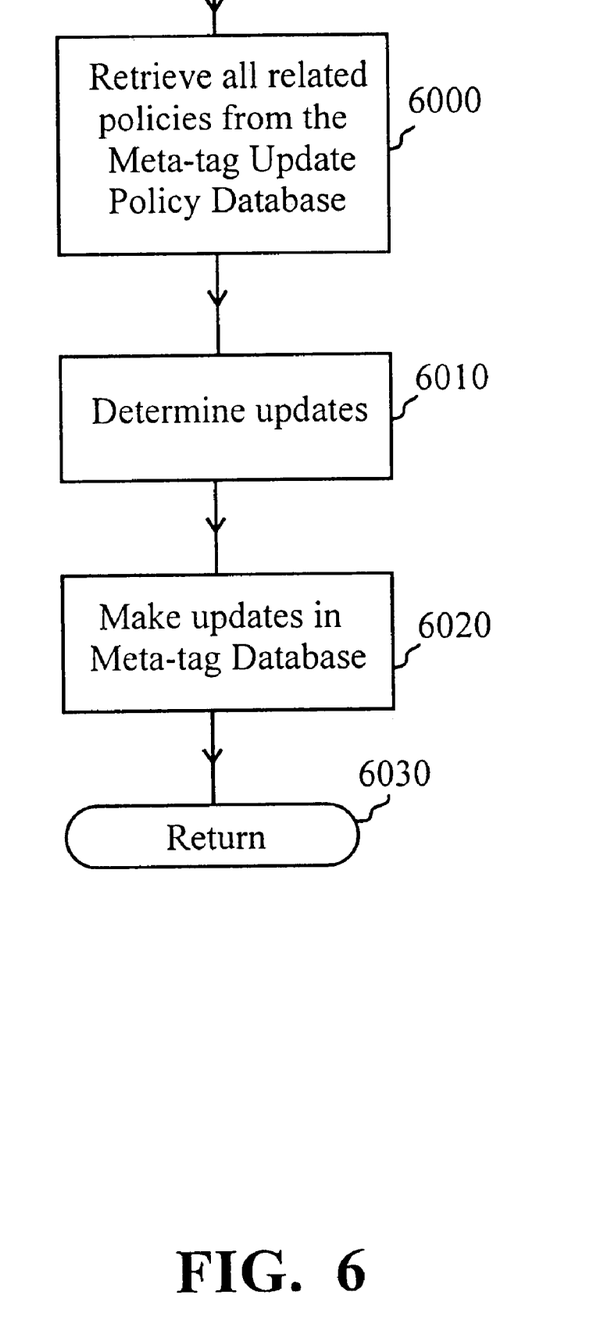
FIG. 6 is a flow diagram of a method of a meta-tag update handler according to an embodiment of the invention.

FIG. 6 depicts an example of the Meta-Tag Update Handler 2040, the module which updates the given user's meta-tag based on the user's behavior. The rules for modifying meta-tags are specified by meta-tag update policies which are stored in the Meta-Tag Update Policy Database 2060. These polices indicate how a given user's mega-tag should be modified in the event of particular observed behaviors. In general, in the preferred embodiment, these rules are of the form:

IF (<behavior>) THEN (<meta-tag modification>) OR

IF (<behavior>)
   THEN (<meta-tag modification #1>)
   ELSE (<meta-tag modification #2>)

where <behavior> indicates an observable behavior, and <meta-tag modification #1> indicates the resulting meta-tag modification to perform in case <behavior> is observed, and <meta-tag modification #2> is the-meta-tag modification to perform otherwise. For example, a policy might specify that a given user's overall rating, i.e., the value of key-value pair whose key is 'overall,' should be incremented each time that user makes a posting. This rule could be written as follows:

IF (ENTERED_DATA) THEN (INCREMENT 'Overall')

Those with regular skill in the art will appreciate that the antecedents, i.e., the behaviors, of these policies can include any Boolean combination of observable behaviors, and the conclusion, i.e., the meta-modifications, can include a list of meta-tag operations. Thus the following meta-tag update policy is also legal:

IF ((ENTERED_DATA) AND (CONTENTS !="Good Morning"))
   THEN ((INCREMENT 'Overall'), (INCREMENT 'Talkative'))

This policy specifies that whatever a user makes an entry and that entry is not simply equal to "Good Morning," then the values of both their 'overall' and 'talkative' meta-tag values should be incremented. The Boolean combinations use for example, and, OR and NOT, as basic building-blocks for allowing the invention to provide additional levels of functionality and complexity.

One skilled in the art will appreciate how an update policy could allow for the dynamic characterization of a user's level of expertise and literacy, such as with or of the following policies respectively:

IF ((ENTERED_DATA) AND (Contains_Expert_Vocabulary(CONTESTS)))
   THEN ((INCREMENT 'Epertise'))
IF ((ENTERED_DATA) AND (Literate(CONTENTS)))
   THEN ((INCREMENT 'Literate'))

In the policies above the functions Contains_Expert_Vocabulary( ) and Literate( ) analyze the user's entrees and return whether they contain high level vocabulary and are literate respectively (both functions being well-known in the word processing industry).

One skilled in the art will appreciate how a user's level of hostility can be dynamically characterized using a function, similar to the two mentioned above, which can determine how hostile a user's statements are by analyzing their content. Such an analysis process enabling such a function is described in Ellen Spertus, "Smokey: Automatic Recognition of Hostile Messages" *Proceeding of the Ninth Conference Innovative Application of Artificial Intelligence (IAAI)* 1997, AAAI Press, Menlo Park, Calif. 1997. So, for example, if one created a function, Is_Hostile, which returned true whenever applied to a message that was hostile, one could maintain knowledge of user's hostility using the following update rule:

IF ((ENTERED_DATA) AND (Is_Hostile (CONTENTS)))
   then ((INCREMENT 'Hostile'))

Similarly, one skilled in the art will appreciate how dynamic characterization of the extent to which the given user maintains coherency, e.g., the probability of the user staying on any given discussion topic, rather than making an unrelated entry, could be provided by including a policy which uses a function that returns whether a given message is coherent. A process enabling such a function is described in Susan Herring, Interactional Coherence in CMC accessible via URL http://www.ascusc.org/jcmc/vol4/issue4/herring.html. So, for example, if one created a function, Maintains_Coherency, which returned true whenever applied to a message that maintains the current topic of conversation, one could maintain knowledge of users' coherency using the following update rule:

IF ((ENTERED_DATA) AND (Maintains_Coherency (CONTENTS)))
   THEN ((INCREMENT 'Coherent'))

One skilled in the art will further appreciate how a dynamic characterization of a given user's dependability, i.e., how likely they are to complete assigned tasks and do so on time, could be provided by including policies like these:

IF ((ENTERED_DATA) AND (Demonstrates_Dependability(CONTENTS)))
   THEN ((INCREMENT 'Dependable'))
IF ((ENTERED_DATA) and (Demonstrate_Undependability(CONTENTS)))
   THEN ((DECREMENT 'Dependable'))

In the two example above, the functions: Demonstrates_Dependability and Demonstrates_Undependability return 1 if true and only if the specified argument indicates that the user is or not dependable respectively. This determination could be made, for example, by each function checking whether the specified messages indicate whether that a pre specified task has been completed. If yes, then the function can check wether the task, e.g. handing a book report, was completed on or before its preset due data, e.g. on or before the end of school. Those with regular skill in the art will appreciate that this task specification and completion checking could easily be accomplished using a standard database, e.g. like DB/2® by IBM.

One skilled in the art will also appreciate how a dynamic characterization of a given user's level, or rate of input can be provided, such as with the following policy:

IF (ENTERED_DATA)
    THEN ((Modify 'Talkative' Level_of_Input (CONTENTS))

Here, the function Level_of_Input compare the length user's just entered message with the constantly update length of the average entry; The value this function returns is then used by the Modify function to update the value of user's 'talkative' key-value pair.

One skilled in the art will also appreciate how a dynamic characterization of a given user's level if interactivity, i.e., just reading, could be provided by including a policy as follows:

IF (Demonstrates_Interactivity(CONTENTS))
    THEN ((INCREMENT 'Interactive'))

The function Demonstrates_Interactivity returns if and only if specified message, CONTENTS, indicates that the user is interacting with others, rather than making an announcement for example. Such a function could simply check whether or not the message is a reply to a previous message. Note that this function could take into account the passage of time, so that the value it returns takes into account how long it has been since the user was last interactive. Those skilled in the art will appreciate that more complex techniques exist and also can be used to make this determination.

One skilled in the art will also appreciate how a policy could be specified that would modify meta-tag values is response to the passage of time. Such policies are useful, since even though a given value might be true at one point in time, its certainty might well decrease with time. For example, even though a given customer was an active participant in the past, they might not still be. One might also want to track the quality of familiarity, i.e., how well a given user knows the given server's data. The following policy, executed each time a user interacts with the Dynamic Access Control Handler 2030 service is a simple example of how these two qualities could be tracked:

IF (Inactive_for_Day)
    THEN ((DECREMENT 'Active') (DECREMENT 'Familiar'))

This policy specifies that if the user whose ID is "Struthers" remains inactive for a full day, the value of their 'Active' key-value pair will be determined. Those with skill in the art will appreciate that the function Inactive_for_Day could be implemented using a text searching script, e.g. written in the Perl programming language, which scanned the usage log of the Dynamic Access Control Handler 2030. The usage log, in this case is just the activity log of the Dynamic Access Control Handler's base HTTP server.

One skilled in the art will also appreciate how a dynamic characterization of a given user's level of familiarity with the server can be provided.

IF (Inactive_for_Day)
    THEN ((DECREMENT 'Active') (DECREMENT 'Familiarity'))
    ELSE ((INCREMENT 'Active') (INCREMENT 'Familiarity'))

This policy specifies that if it has been a full day since the user last interacted with: the system, then the values of their 'Active' and "Familiar' key-value pairs are decremented. If it has been less than a day, then the key-value pairs for these two keys are incremented. Those with regular skill in the art will appreciate that the function Inactive_for_Day could be implemented using a text searching script, e.g. written in the Perl programming language, which scanned the usage log of the Dynamic Access Control Handler 2030. The usage log, in this case is just the activity log of the Dynamic Access Control Handler's base HTTP server.

Finally, one skilled in the art will appreciate how a dynamic characterization of the change with respect to time of the values of given user's meta-tag can be provided. Such information is useful in judging a user's rate of development, e.g., "Pat's level of expertise is increasing quickly." The following policy specifies one such change-rate-tracker:

IF (Modified 'Dependable')
    THEN (Update_Rate_of_Change 'Dependable_Rate_of_Change')

Here, the function Modified returns whenever the value of the specified primary key's, i.e., 'Dependable,' key-value pair is changed. Further the function Update_Rate_of_Change modifies the value of specified key's, i.e., 'Dependable_Rate_of_Change,' key-value pair to indicate the current rate of change. One skilled in the art will appreciate how standard database, e.g., DB/2®, could be used to implement the Update_Rate_of_Change function. One skilled in the art will further appreciate that similar methods can be used to provide dynamic characterization of both stability, i.e. how stable a given user's key-value pair value is, and higher order rate change calculations, e.g., acceleration: "Pat's level of expertise is increasing faster and faster."As shown in FIG. 6, in step 6000 all policies from the Meta-Tag Update Handler 2040 determine what, if any updates to the given user's meta-tag should be made 6010. In step 6020 any and all such updates are made posting the updated meta-tag in the Meta-Tag Database 2080. Control is returned in step 6030.

One with regular skill in the art will appreciate that since meta-tags are simply data, they can be requested, e.g., via a HTTP cgi-bin script which retrieves meta-tags from the Meta_Tag Database 2080. These requests including those from a given user requesting their own meta-tag, as well as outside users, i.e., users not registered in the Dynamic Access control Handler 2030.

Having described embodiments of a method for controlling an entity's access to a resource based on observed behavior of the entity, it is noted that modifications and variations can be made by persons skilled in the art in light of the above teachings. It is therefore to be understood that changes can be made in the particular embodiments of the invention disclosed which are within the scope and spirit of the invention as defined by the appended claims. Having thus described the invention with the details and particularity required by the patent laws, what is claimed and desired protected by Letters Patent is set forth in the appended claims.

What is claimed is:

1. A method for controlling an entity's access to a resource based on observed behavior of the entity comprising the steps of:
    assigning the entity a default authorization meta-tag comprising a key-value rating describing behavior of the entity;
    evaluating the entity's behavior against a plurality of policies; and
    updating the key-value rating based upon the evaluation of the entity's behavior.

2. The method of claim 1, wherein the authorization meta-tag is multidimensional.

3. The method of claim 1, wherein the meta-tag is a PICS label.

4. The method of claim 1, further including the step of granting access to the resource based on policies having a present level of rating from the entity's authorization meta-tag.

5. The method of claim 1, wherein the resource is an executable and data.

6. The method of claim 1, wherein the meta-tag characterizes one of the entity's dependability, expertise and interactivity.

7. The method of claim 1, wherein the meta-tag characterizes one of the entity's activity, quality of input and hostility.

8. The method of claim 2, wherein the meta-tag includes a confidence level rating for a rating contained in the meta-tag.

9. The method of claim 1, wherein the authorization meta-tag changes in relation to time.

10. A computer useable medium having computer readable program code embodied therein for automatically updating a meta-tag based on observed behavior, the computer readable program code in the computer program product comprising:

computer readable program code for causing a computer to retrieve a policy associated with the meta-tag from a policy database, wherein the meta-tag provides at least one key-value rating describing behavior of an entity;

computer readable program code for causing the computer to compare the policy to an observed behavior of the entity, wherein the observed behavior of the entity satisfies the policy; and computer readable program code for causing the computer to modify the key-value rating according to the policy, the policy specifying a modification based on the observed behavior of the entity.

11. The computer program of claim 10, wherein the meta-tag comprises at least one pair of indicia describing a user.

12. The computer program of claim 10, wherein the meta-tag is assigned to a new user and stored in the meta-tag database.

13. The computer program of claim 10, wherein the observed behavior comprises one of a defined observable behavior and a Boolean combination of defined observable behaviors.

14. The computer program of claim 13, wherein the Boolean combination is defined as a plurality of behaviors linked by an operation in a policy.

15. The computer program of claim 10, wherein the computer determines an update by comparing the retrieved policy to the observed behavior.

16. The computer program of claim 10, wherein the computer posts an update to the meta-tag database when the retrieved policy matches the observed behavior.

17. A program storage device readable by machine, tangible embodying a program of instructions executable by the machine to perform method steps for automatically updating a meta-tag based on observed behavior, the method steeps comprising:

retrieving a policy associated with the meta-tag from a policy database, wherein the meta-tag provides at least one key-value rating describing behavior of an entity;

comparing the policy to an observed behavior of the entity, wherein the observed behavior of the entity satisfies the policy; and modifying the key-value rating according to the policy, the policy specifying a modification based on the observed behavior of the entity.

18. The method for automatically updating the meta-tag as in claim 17, further comprising the steps of:

assigning a new user a default meta-tag; and storing the meta-tag in the meta-tag database.

19. The method for automatically updating the meta-tag as in claim 17, further comprising the step of modifying the meta-tag according to the policy, the policy specifying the modification based on observed behavior.

20. The method for automatically updating the meta-tag as in claim 17, wherein determining the update further comprises the step of:

comparing the retrieved policy to the observed behavior;
if the observed behavior is equal to a behavior defined in the policy increment the meta-tag;
if the observed behavior is not equal to a behavior defined in the policy the key-value rating is not updated.

21. The computer program of claim 10, wherein the meta-tag comprises a confidence level rating for a key-value rating contained in the meta-tag, wherein the confidence level rating corresponds to one of an age of the key-value rating contained in the meta-tag, a maximum value of the key-value rating contained in the meta-tag over a given time period, and a minimum value of the key-value rating contained in the meta-tag over the given time period.

* * * * *